Aug. 30, 1932.　　　E. W. HABERMAAS　　　1,874,511
PASTRY MOLD
Filed May 18, 1929
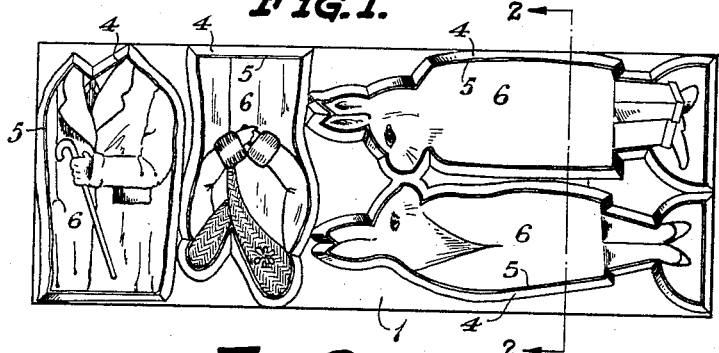
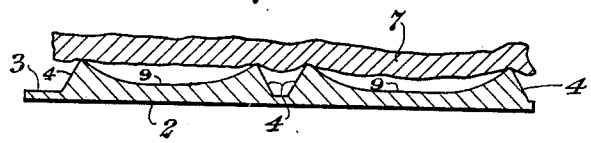
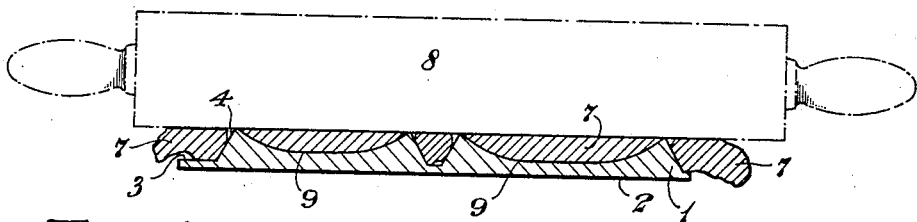
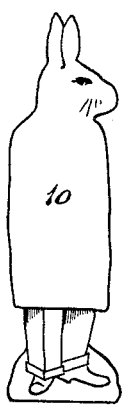
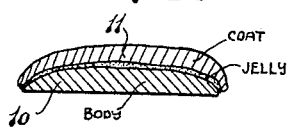
INVENTOR.
Edward W. Habermaas.
BY *James N. Ramsey*
ATTORNEY.

Patented Aug. 30, 1932

1,874,511

UNITED STATES PATENT OFFICE

EDWARD W. HABERMAAS, OF CINCINNATI, OHIO, ASSIGNOR TO LOUISE H. HABERMAAS, OF CINCINNATI, OHIO

PASTRY MOLD

Application filed May 18, 1929. Serial No. 364,098.

This invention relates to molds provided with a cutting edge whereby dough is cut into shapes and molded or embossed at one operation to resemble various likenesses, such as rabbits, turkeys, fruit baskets, Santa Clauses, and similar pastry designs.

The object of the present invention is to provide a mold having a cutting edge whereby a thin layer of dough may be placed thereover and by means of a rolling pin, or the like, said dough can be forced within the mold and cut simultaneously by the rolling pin engaging the cutting edge of said mold. The cavity forming the recess 9 is very shallow with respect to its area and the surface of said cavity approaches the sharp cutting edge 5 very gradually in order to aid the removal of the product.

The invention consists in the construction, combination, location and arrangement of parts as hereinafter more fully set forth and claimed.

In the drawing:

Fig. 1 is a plan view of a mold embodying the features of my invention;

Fig. 2 is a cross section thereof taken on a plane corresponding to line 2—2 of Fig. 1 with a thin layer of dough placed thereover previous to the molding and cutting operation;

Fig. 3 is a cross sectional view similar to Fig. 2 showing a rolling pin in dotted outline after it has forced the dough within the mold and cut the dough by virtue of the cutting edge of the mold coming into contact with said rolling pin;

Fig. 4 shows a representation of the body portion of a rabbit formed by the mold shown in Fig. 1;

Fig. 5 shows the coat adapted to be used in connection with the body portion of the rabbit shown in Fig. 4;

Fig. 6 shows the body portion of a rabbit also made from the mold shown in Fig. 1;

Fig. 7 represents the coat for the body portion shown in Fig. 6; and

Fig. 8 shows the manner in which the coats are attached upon their respective body portions.

In the embodiment of my invention as illustrated and which shows a preferred construction I provide a mold 1, comprising bottom 2 and upper surface 3, which upper surface is provided with walls 4, the upper edge 5 of which walls constitutes the cutting edge of the mold. The outer surfaces of the walls 4 are preferably tapered and the area 6 within the cutting edge 5 may be of different shapes and designs and, for illustration purposes only, I have shown the mold 1 as composed of two rabbits in addition to coats for each of said rabbits.

When in use the mold 1 is preferably laid on a table and a thin layer of mold plastic material, such as dough 7, is placed over the cutting edges 5, whereupon a rolling pin 8 can be rolled over said dough 7, as shown in Fig. 3, to firmly compress it into the recesses 9 of said mold to give the dough a shape to correspond with the recesses and, at the same time the rolling pin 8 is forcing the dough 7 within the recesses 9, it also engages the cutting edge 5 of each figure or garment, as the case may be, thereby simultaneously cutting the dough to shape while forming or pressing the dough into the recesses 9. As the dough 7 has been forced into the recesses 9 of the mold 1 and cut in the manner as above described, all that is necessary is to invert the mold 1, whereupon the formed images drop out of the recesses 9 upon any suitable receiving device, such as a pan, table, or the like. All of the excess dough which is squeezed out of the recesses 9, beyond the cutting edge 5, may then be worked over and flattened out to form a thin layer of dough. The layer can be placed over the mold, as shown in Fig. 2, and compressed and cut in the manner shown in Fig. 3, until all of the dough has been molded to the desired shape, or a shape corresponding to the mold 1.

An advantage of an improved mold of this type is that the forming and cutting operation of the finished cake or cookie is accomplished simultaneously by the rolling pin 8 and the cutting edge 5.

Another advantage of this invention is that the body portions 10 may be made from a mold plastic material, such as dough, and the coats 11 may be made of different material, such as candy, and after forming said body portions and coats, the coats may be placed over their respective body portions and anchored thereon by means of jelly, or the like, to form a novel coated cookie by means of the utmost simplicity.

Still another advantage of my invention is that it provides simple and efficient means for producing a great variety of practical and attractive food products having embossed surfaces to represent articles particularly adapted for special events or seasons of the year, such as cakes in imitation of rabbits for Easter, pumpkins for Halloween, turkeys for Thanksgiving, Santa Clauses for Christmas, etc.

While I have shown and described a mold having a design of rabbits and coats it is to be understood that various other objects or images can be used without departing from the scope or spirit of the invention as claimed.

What I claim as new and desire to secure by Letters Patent is:

A mold for forming an embossed edible product or article comprising a solid base having a recess enclosed within a projecting sharp cutting edge, the cavity forming said recess being very shallow with respect to its area and having the surface of said cavity approach the sharp cutting edge very gradually in order to aid the removal of the product.

EDWARD W. HABERMAAS.